US011824366B2

(12) United States Patent
Stevenson, III (10) Patent No.: US 11,824,366 B2
(45) Date of Patent: Nov. 21, 2023

(54) WIRELESS CHARGING DEVICE SYSTEM WITH A VENTILATED HOUSING

(71) Applicant: Young Wilkerson Stevenson, III, Dallas, TX (US)

(72) Inventor: Young Wilkerson Stevenson, III, Dallas, TX (US)

( * ) Notice: Subject to any disclaimer, the term of this patent is extended or adjusted under 35 U.S.C. 154(b) by 220 days.

(21) Appl. No.: 17/346,237

(22) Filed: Jun. 12, 2021

(65) Prior Publication Data

US 2021/0305826 A1 Sep. 30, 2021

Related U.S. Application Data

(63) Continuation of application No. 16/192,732, filed on Nov. 15, 2018, now abandoned.

(51) Int. Cl.
| H01M 10/46 | (2006.01) |
| H02J 50/10 | (2016.01) |
| H02J 7/00 | (2006.01) |
| H02J 50/00 | (2016.01) |
| H04M 1/04 | (2006.01) |

(52) U.S. Cl.
CPC ............ *H02J 50/10* (2016.02); *H02J 7/0044* (2013.01); *H02J 50/005* (2020.01); *H04M 1/04* (2013.01)

(58) Field of Classification Search
CPC ........ H02J 7/0044; H02J 7/0042; H02J 50/10; H02J 50/005; H04M 1/04
USPC ................................. 320/107, 108, 114, 115
See application file for complete search history.

(56) References Cited

U.S. PATENT DOCUMENTS

| 5,539,821 | A | 7/1996 | Blonder |
| 7,855,529 | B2 | 12/2010 | Liu |
| 8,026,693 | B2 | 9/2011 | Burley |
| 8,183,825 | B2 | 5/2012 | Sa |
| 8,633,616 | B2 | 1/2014 | Soar |
| 9,130,384 | B2 | 9/2015 | Pliner et al. |
| 9,368,999 | B2 | 6/2016 | Watanabe et al. |
| 9,525,293 | B2 | 12/2016 | Ito et al. |
| 2008/0290836 | A1 | 11/2008 | Tsai et al. |
| 2011/0084651 | A1 | 4/2011 | Caskey et al. |
| 2013/0052871 | A1 | 2/2013 | Eklind |
| 2014/0139179 | A1 | 5/2014 | Chen |
| 2016/0036478 | A1 | 2/2016 | Wong |
| 2016/0064987 | A1 | 3/2016 | Sheu et al. |
| 2017/0114965 | A1 | 4/2017 | Maglica et al. |
| 2019/0072999 | A1 | 3/2019 | Escamilla et al. |

FOREIGN PATENT DOCUMENTS

EP 2146414 A1 * 1/2010 ........... G06F 1/1632

* cited by examiner

Primary Examiner — Edward Tso (57) ABSTRACT

A charging device may include a housing having a front portion and a rear portion coupled to the front portion, at least one support disposed within and coupled to the housing, an inductive charging mechanism disposed within and coupled to the housing, and at least one support that is disposed at an angle toward the inductive charging mechanism. The back surface of the front portion may contain an indentation, and the inductive charging mechanism may be disposed in the indentation. The housing may contain at least one opening to ventilate the housing. At least one support may be coupled to an interior surface of the housing. The charging device may include a means for providing power to the inductive charging mechanism and/or a means for coupling the housing to a surface.

18 Claims, 7 Drawing Sheets

WIRELESS CHARGING DEVICE SYSTEM WITH A VENTILATED HOUSING

CROSS-REFERENCE TO RELATED APPLICATION

This application is a continuation of U.S. Non-Provisional patent application Ser. No. 16/192,732 filed Nov. 15, 2018 and entitled "Charging Device System", which is incorporated herein by reference in its entirety for all purposes.

TECHNICAL FIELD

The present disclosure relates to charging devices.

BACKGROUND

Technology is pervasive throughout society. Millions of people rely on the technology found in electronic devices for navigation, communication, and entertainment every day. These electronic devices require a power source but also need to be mobile, and as such, typically include a rechargeable battery. Charging the rechargeable battery of an electronic device typically includes either the use of a charging cord or an inductive charger connected to a source of electricity.

Traditional inductive chargers include a flat surface containing an inductive charging device connected to a source of electricity. To use the inductive charger, the user must position the electronic device horizontally in contact with the flat surface of the inductive charger. Thus, when charging the electronic device using an inductive charging device, the user is limited in mobility and cannot readily use the electronic device for its intended purpose. Furthermore, if the user cannot find a flat surface to lay the electronic device on the inductive charging device, the user cannot charge the electronic device and risks completely running out of battery, which can result in the user being lost without navigation, communication, or entertainment in this technology dependent world.

SUMMARY

In one implementation, the present disclosure is directed to a charging device including a housing configured to hold an electronic device. The housing may have a front portion and a rear portion coupled to the front portion. The charging device may further include an inductive charging mechanism configured to charge the electronic device in the housing, at least one opening in the front portion to ventilate the housing, and at least one support in the housing to place the electronic device in a proper charging position with respect to the inductive charging mechanism. In various arrangements, the front portion of the housing may contain an indentation to hold the inductive charging mechanism, the opening(s) may be through a base wall of the front portion, the support may be coupled to an interior surface of the front portion, and/or the rear portion may be removable from the front portion. In some implementations, the support may be triangular, rectangular, cylindrical, polygonal, or square in shape. The charging device may further include a means for providing power to the inductive charging mechanism, and/or a means of coupling the housing to a surface.

In another implementation, the present disclosure is directed to a charging device including a housing having a front portion and a rear portion coupled to the front portion, at least one support disposed within and coupled to the housing, and an inductive charging mechanism disposed within and coupled to the housing. In some implementations, the support(s) is disposed at an angle toward the inductive charging mechanism. In various arrangements, the back surface of the front portion may contain an indentation, the inductive charging mechanism may be disposed in the indentation, the housing may contain at least one opening to ventilate the housing, the support(s) may be coupled to an interior surface of the housing, and/or the support(s) may be triangular, rectangular, cylindrical, polygonal, or square in shape. The charging device may further include a means for providing power to the inductive charging mechanism, and/or a means for coupling the housing to a surface.

In yet another implementation, the present disclosure is directed to a charging device including a housing having a front portion, means for covering an exterior back surface of the front portion, means for holding an inductive charging mechanism in or on the exterior back surface, means for ventilating the housing, means for supporting an electronic device in a proper charging position within the housing, and means for inductively charging the device. The charging device may further include means for coupling the housing to a surface, and/or means for providing power to the inductive charging mechanism.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Figure 1:
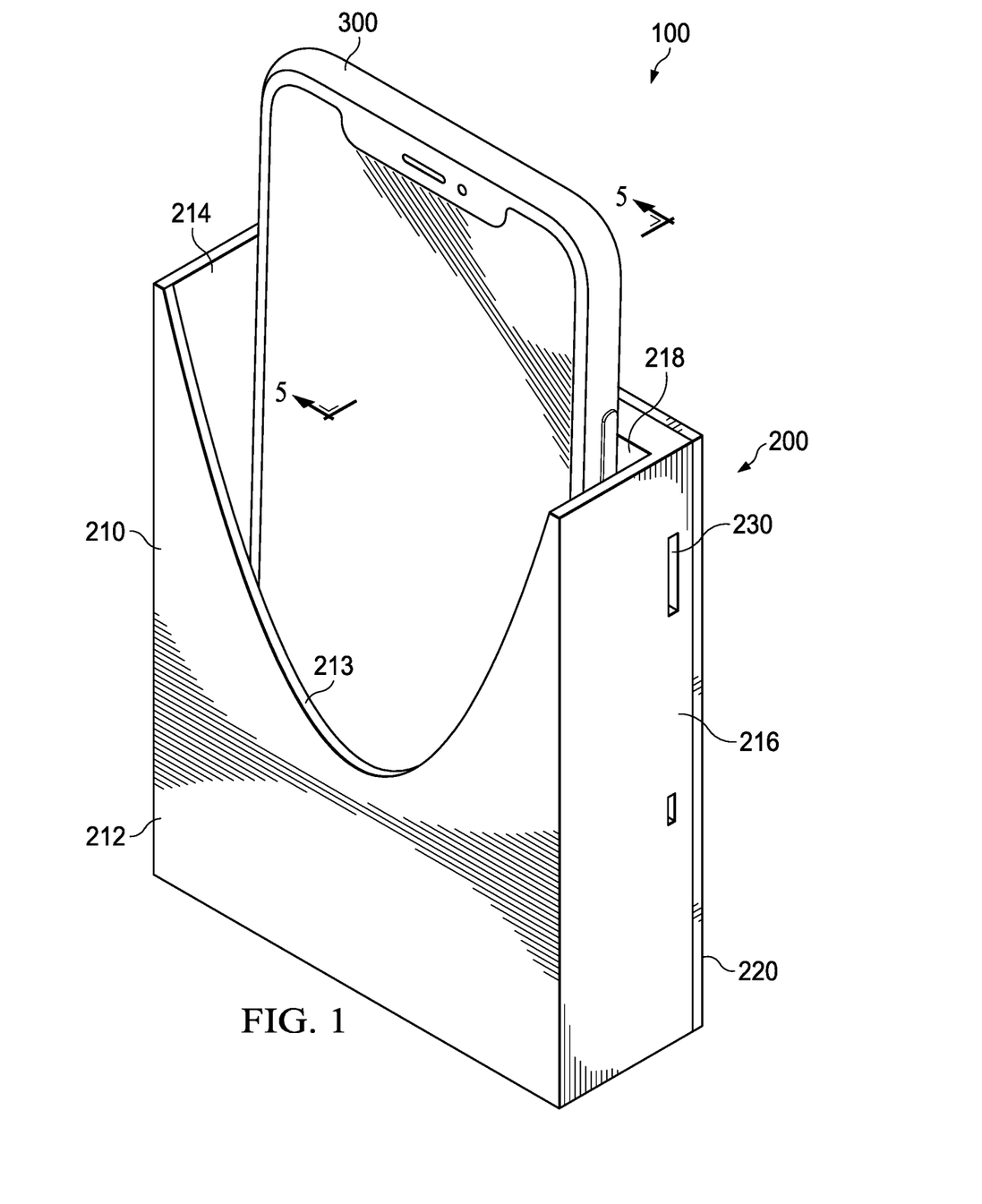
FIG. 1 illustrates a perspective view of a charging device system according to the present disclosure, with a housing of the charging device system shown holding an electronic device.
Figure 3:
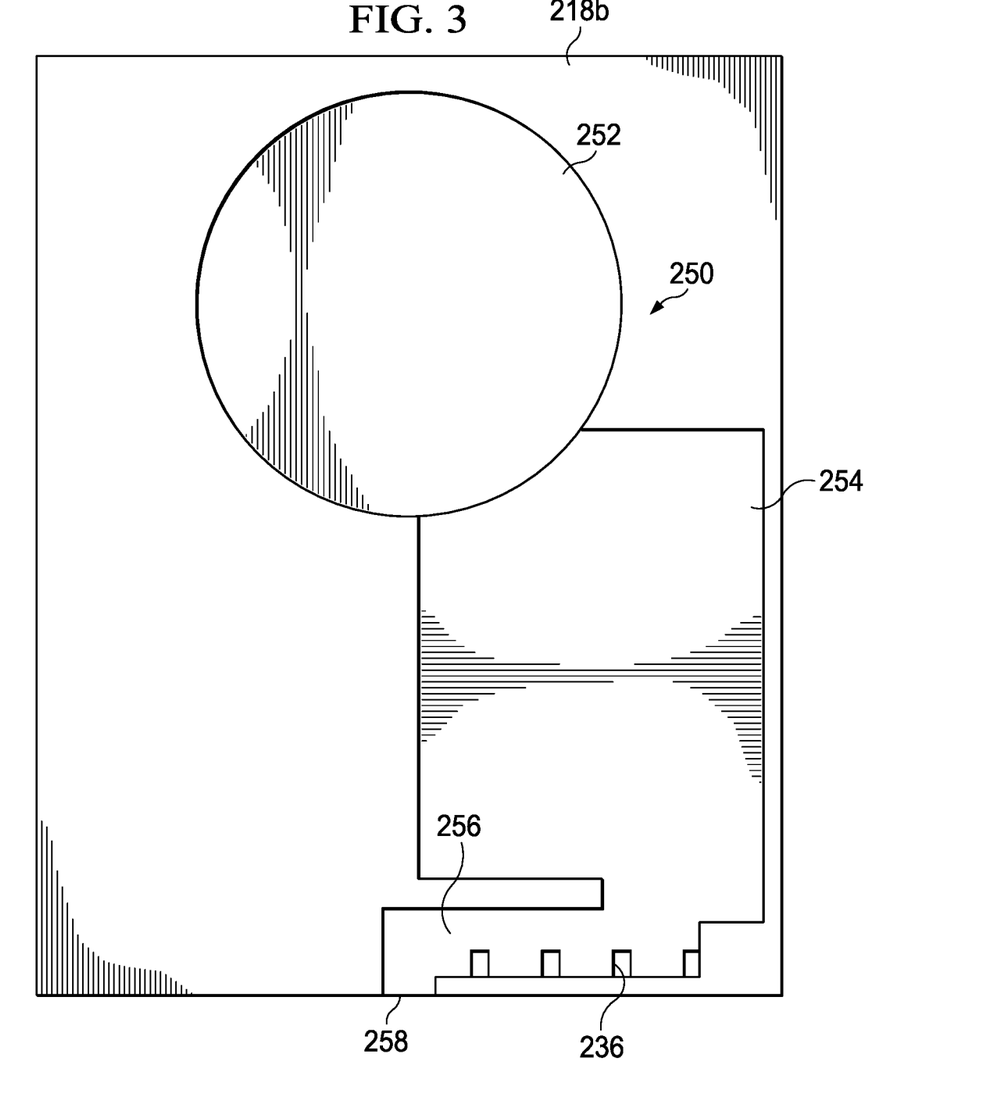
FIG. 3 illustrates an elevation view of a back surface of the front portion of the charging device of FIG. 1, the back surface including an indentation.
Figure 4:
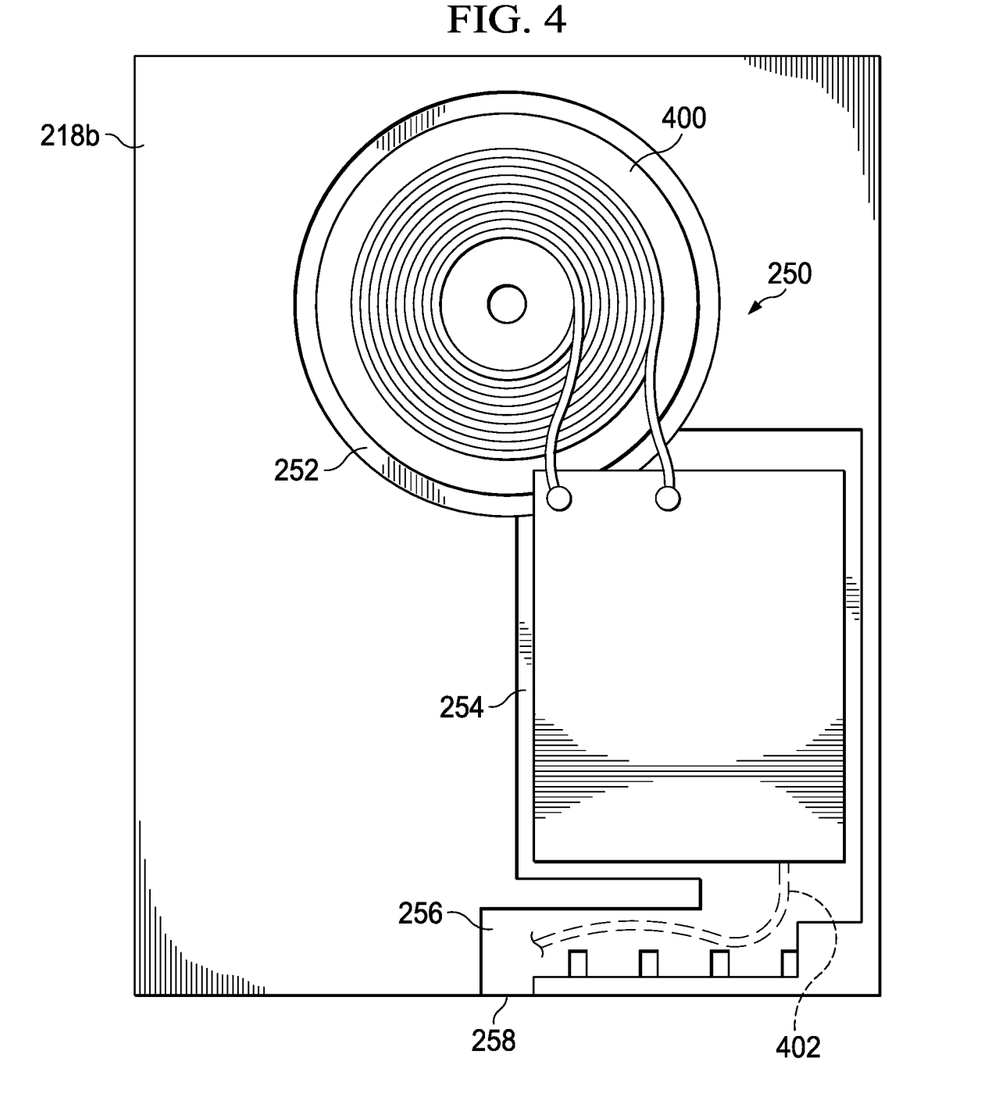
FIG. 4 illustrates an elevation view of the back surface of FIG. 3, with the indentation shown holding an inductive charging mechanism.
Figure 5:
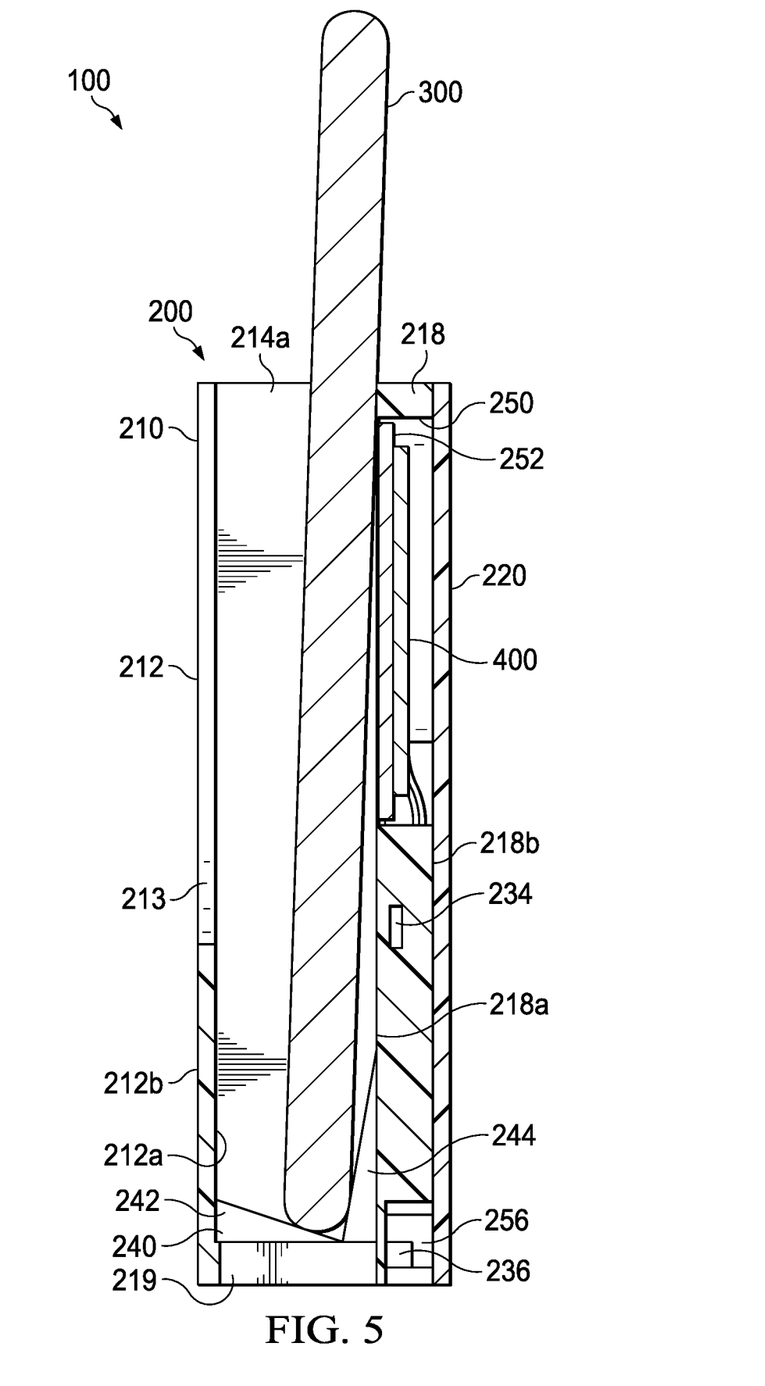
FIG. 5 illustrates a side cross-sectional view, taken along Section line 5-5 of FIG. 1, of the charging device holding an electronic device.

FIG. 1-5 depict various views of a charging device system 100 comprising a housing 200 and a charging mechanism 400. The charging device system 100 is designed to charge an electronic device 300, as shown in FIG. 1 and FIG. 5.

Figure 2:
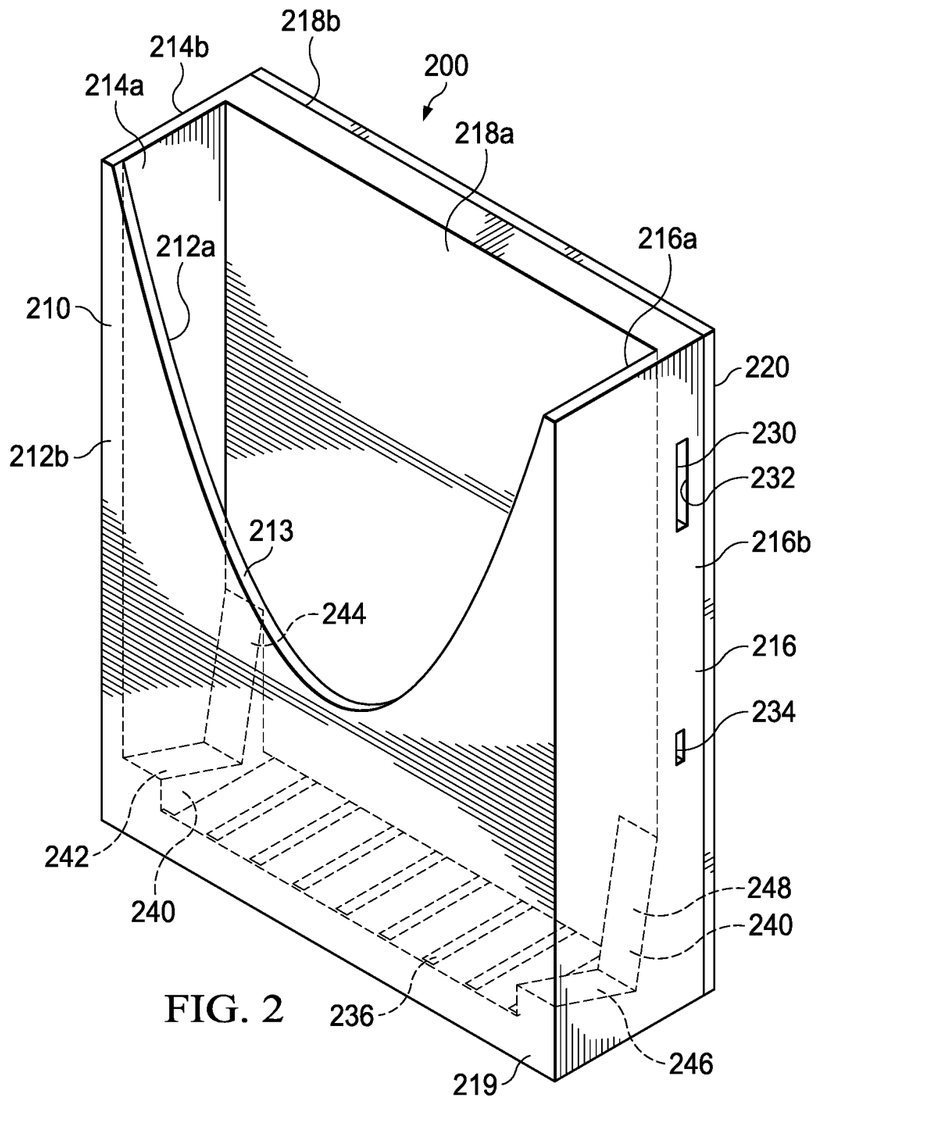
FIG. 2 illustrates a perspective view of the charging device system of FIG. 1.

FIG. 1 and FIG. 2 illustrate perspective views of the charging device system 100 with the housing 200 holding the electronic charging device 300. In one implementation, the housing 200 may comprise a front portion 210 and a rear portion 220 coupled to said front portion 210. In one implementation, rear portion 220 may be detachable or removeable from front portion 210. In another implementation, rear portion 220 may be permanently affixed to front portion 210. In another implementation, rear portion 220 may be de-coupled and re-coupled to front portion 210. In various implementations, rear portion 220 may be coupled to front portion 210 using adhesion, chemical bonding, magnetism, rubber bands, Velcro, a ball and joint socket, and, or mechanical means such as a nail, hook, or bracket, or any other suitable means of coupling. Housing 200 may be made of any material, including but not limited to, plastic, wood, metal, clay, glass, fabric, or any other suitable material.

The front portion 210 may include a front wall 212, a first side wall 214, a second side wall 216, a back wall 218, and a base wall 219, which may be interconnected. In one implementation, the front wall 212 is coupled to a first side wall 214 and a second side wall 216 along opposite edges in a parallel manner; and the back wall 218 is coupled to the first side wall 214 and the second side wall 216 along opposite edges in a parallel manner, thereby forming a rectangle with a hollow interior. In one implementation, base 219 couples to the bottom of the rectangle to each of the front wall 212, the first side wall 214, the second side wall 216, and the back wall 218 to close the bottom of the hollow interior of rectangle. In one implementation, front wall 212 may include front wall interior surface 212a and front wall exterior surface 212b. In one implementation, first side wall 214 may include first side wall interior surface 214a and first side wall exterior surface 214b. In one implementation, second side wall 216 may include second side wall interior surface 216a and second side wall exterior surface 216b. In one implementation, back wall 218 may include back wall interior surface 218a and back wall exterior surface 218b. In one implementation, back wall 218 may be solid or it may contain openings. Back wall 218 may be of any thickness. In one implementation, front portion 210 may include more or less than a first side wall 214 and a second side wall 216, or no side walls at all. In another implementation, the front portion 210 may not contain a front wall 212, or a back wall 218. In another implementation, front portion 210 may not include a base wall 219. In one implementation, rear portion 220 is coupled to the back wall exterior surface 218b of back wall 218. In various implementations, the front portion 210 may be rectangular, cylindrical, triangular, square, polygonal, or any other shape.

In one implementation, front wall 212 may contain cutout section 213. In yet another implementation, front wall 212 may not contain a cutout section 213. Cutout section 213 may be curved, rectangular, straight, or any other shape. Cutout section 213 may be a design etched on, through, or partially through the front wall 212. In operation, cutout section 213 may allow a user to view a portion of the electronic device 300 when placed in the housing 200. In operation, cutout section 213 may provide additional ventilation to housing 200. In operation, cutout section 213 may also be used for identification and personalization.

In one implementation, the housing 200 contains one or more ventilation openings 230. Ventilation openings 230 may be rectangular, square, circular, or any other shape. Ventilation openings 230 may be on any surface of the housing 200, and in one implementation, ventilation openings 230 may be formed in a side wall, such as second side wall 216. In one implementation, ventilation openings 230 may include a first vent 232, a second vent 234, and a plurality of base vents 236. Ventilation openings 230 may include all or none of the first vent 232, the second vent 234, and the base vents 236. Ventilation openings 230 may be of any shape or size. In one implementation, the base vents 236 are horizontal openings in the base wall 219 that extend from the front wall 212 to the back wall 218, spaced equidistantly from the first side wall 214 to the second side wall 216. In one implementation, ventilation openings 230 extend through the housing 200. In another implementation, ventilation openings 230 may protrude inward or outward from the second side wall 216, the first side wall 214, and/or the base wall 219. In yet another implementation, ventilation openings 230 may not protrude and may instead be flush with the second side wall 216, the first side wall 214, and/or the base wall 219. Ventilation openings 230 may also be the absence of material or the presence of a different material such as a porous substance. In operation, ventilation openings 230 may be used to allow heat to escape the housing 200.

In one implementation, housing 200 includes interior supports 240 on either end of base wall 219 in the bottom of housing 200. In one implementation, interior supports 240 include first support 242 and second support 244 on one end of base wall 219 nearest first side wall 214, and third support 246 and fourth support 248 on the opposite end of base wall 219 nearest second side wall 216. Interior supports 240 may be triangular, rectangular, cylindrical, polygonal, square or any other shape. Interior supports 240 may include only one or multiple supports. In one implementation, first support 242 may be adjacent to second support 244, and third support 246 may be adjacent to fourth support 248. In one implementation, first support 242 may be adjacent to first side wall interior surface 214a, front wall interior surface 212a, and base wall 219. In one implementation, second support 244 may be adjacent to first side wall interior surface 214a, back wall interior surface 218a, and base wall 219. In one implementation, first support 242 and second support 244 may be adjacent such that together, they form a substantially "V" shape. In one implementation, third support 246 may be adjacent to second side wall interior surface 216a, front wall interior surface 212a, and base wall 219. In one implementation, fourth support 248 may be adjacent to second side wall interior surface 216a, back wall interior surface 218a, and base wall 219. In one implementation, third support 246 and fourth support 248 may be adjacent such that together, they form a substantially "V" shape. In one implementation, first support 242, second support 244, third support 246, and fourth support 248 are triangles, and the first support 242 and second support 244 are in different orientations. In one implementation, the third support 246 and the fourth support 248 are in different orientations. In one implementation, first support 242 and second support 244 are triangles adjacent to first side wall interior surface 214a such that the shortest side of each triangular first support 242 and second support 244 are adjacent. In another implementation, interior supports 240 are coupled to an interior surface of housing 200. In one implementation, interior supports 240 are extruded or molded portions of front wall 212, first side wall 214, second side wall 216, or back wall 218. In one implementation, as a replacement for first support 242 and second support 244, a single support 240 is provided which may be triangular in shape and extend across back wall 218, and upward from base wall 219. In one implementation, interior supports 240 may be the same size and shape. In another implementation, interior supports 240 may be of a different size and shape. In one implementation, interior supports 240 are configured to dispose an electronic device 300 at an angle toward back wall interior surface 218a. In operation, interior supports 240 may be used to properly orient an electronic device 300 for charging. In one implementation, electronic device 300 may or may not be present, and electronic device 300 may be positioned in housing 200 in any orientation. In operation, charging device system 100 may be used to charge any electronic device that has a rechargeable battery and that fits within housing 200.

FIG. 3 and FIG. 4 illustrate elevation views of the back wall exterior surface 218b of the front portion 210 of the housing 200. The back wall exterior surface 218b may include an indentation 250 configured to house charging mechanism 400. Referring now to FIG. 3, in one implementation, the indentation 250 includes a disc portion 252, a board portion 254, and a power cord portion 256. The indentation 250 may be pressed, carved, extruded, molded, or otherwise formed into the depth of the back wall 218 of the front portion 210 of the housing 200. In one implementation, the indentation 250 has a depth less than the thickness of back wall 218; in other implementations, the depth of indentation 250 is equal to or greater than the thickness of back wall 218. In one implementation, the indentation 250 includes all, one, some, or none of the disc portion 252, board portion 254, and power cord portion 256. In one implementation, power cord portion 256 includes an opening to the external atmosphere. FIG. 3 further illustrates base vents 236, as in one implementation, extending through back wall 218 and exposing the inside of the housing 200 to the atmosphere. In one implementation, indentation 250 does not recess into back wall 218, but protrudes outward from, or is flush with, back wall 218.

Referring now to FIG. 4, in one implementation, indentation 250 is shaped to house charging mechanism 400. Charging mechanism 400 may be any kind of charging mechanism that may be used to charge an electronic device. In one implementation, the charging mechanism 400 is an inductive charger, such as a Qi charger. A Qi charger is a standard inductive charger established by the Wireless Power Consortium. In one implementation, the charging mechanism 400 may be connected to a power source using power cord 402. The power source may be an electrical outlet, a battery, a chemical means of power, or any other kind of power source. In one implementation, power cord portion 256 of indentation 250 includes an opening 258 to the external atmosphere such that power cord 402 may connect to the charging mechanism 400. Power cord 402 may be a micro USB cord, a USB cord, HDMI cord, or any other power cord that can be used to provide power to a charging device. In one implementation, indentation 250 is the shape of a Qi charger and the charging mechanism 400 is a Qi charger such that the charging mechanism 400 fits within indentation 250 and is flush or recessed to the back wall exterior surface 218b.

FIG. 5 is a side cross-sectional view of the charging device system 100 when charging an electronics device 300, the cross-sectional view taken along Section line 5-5 of FIG. 1. FIG. 5 illustrates how, in one implementation, interior supports 240 function to hold electronic device 300 in a proper charging position with respect to charging mechanism 400. In one implementation, first support 242 and second support 244 contact electronic device 300 such that electronic device 300 is angled slightly backward toward back wall interior surface 218a and closer to charging mechanism 400 at the top of the housing 200 than the bottom, when the bottom of the housing 200 is base wall 219. In one implementation, interior supports 240 are disposed at an angle toward charging mechanism 400. In other implementations, interior supports 240 may be in a different orientation, and first support 242 or second support 244 may both, one, or neither physically contact electronic device 300. In one implementation, as a replacement for first support 242 and second support 244, a single support 240 is provided which may be triangular in shape, extend across back wall interior surface 218a, and extend upward from base wall 219 to the top of back wall 218. In one implementation, interior supports 240 may contain additional charging mechanisms, or magnetic material suspending the device in the proper position. In operation, charging device system 100 may be used to charge an electronic device, such as electronic device 300. In operation, interior supports 240 properly position the electronic device 300 with respect to the charging device 400 to ensure charging regardless of the orientation of the electronic device 300 in housing 200.

Figure 6:
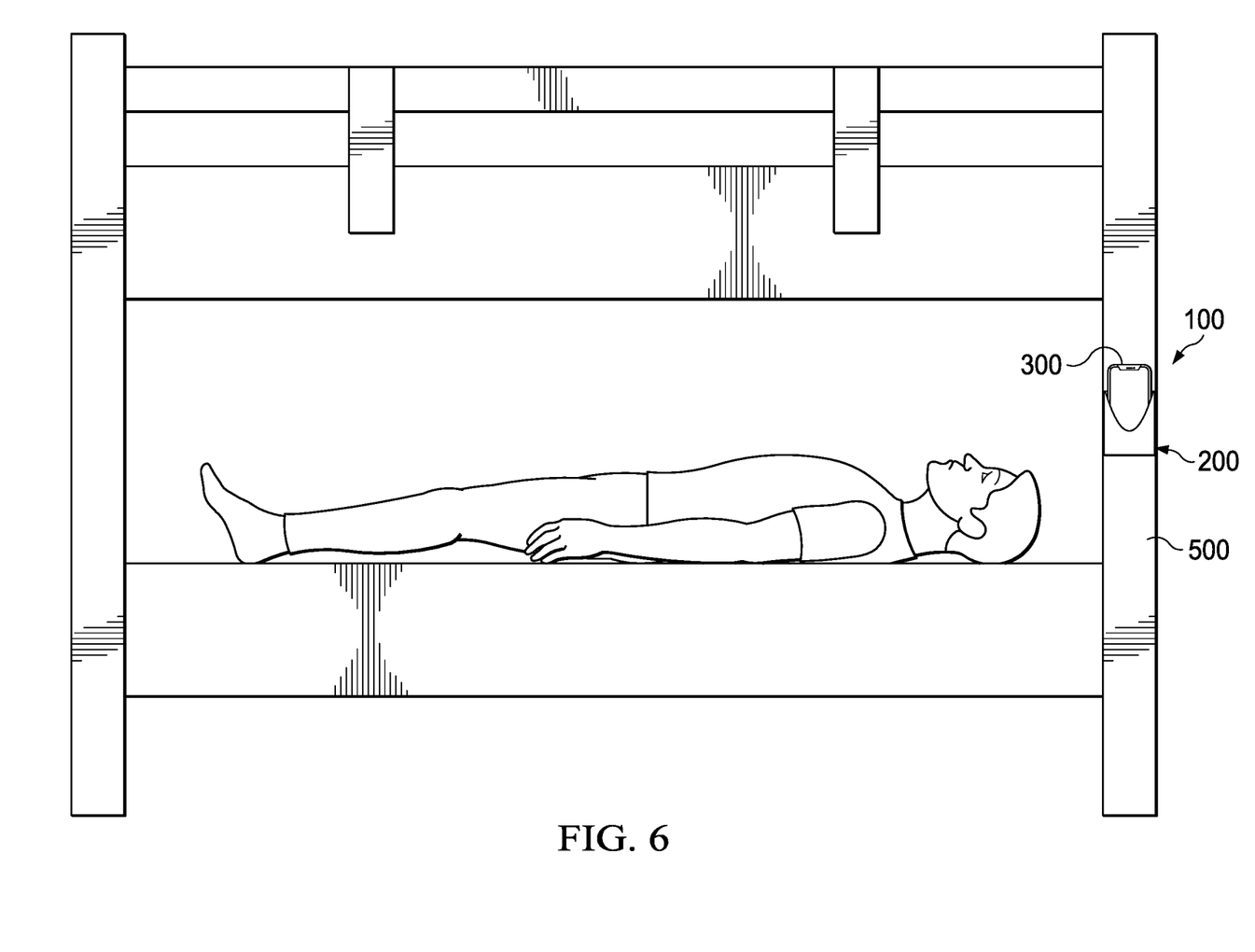
FIG. 6 illustrates an environmental view of a charging device system holding an electronic device and coupled to a bed post surface.

FIG. 6 illustrates an environmental view showing how the charging device system 100 may be used to charge an electronic device 300 while coupling the housing 200 to a surface 500. In one implementation, surface 500 may be the vertical post of a bunk bed, as shown in FIG. 6, but surface 500 may be any surface, and surface 500 may be in any orientation, vertical, horizontal, or otherwise. Housing 200 may be coupled to surface 500 in any manner. In one implementation, housing 200 may be coupled to surface 500 using adhesion, chemical bonding, rubber bands, Velcro, a ball and joint socket, or mechanical means such as a nail, hook, or bracket, or any other suitable means of coupling. Housing 200 may be coupled to surface 500 in any orientation, and housing 200 may be coupled to surface 500 with or without electronic device 300.

Figure 7:
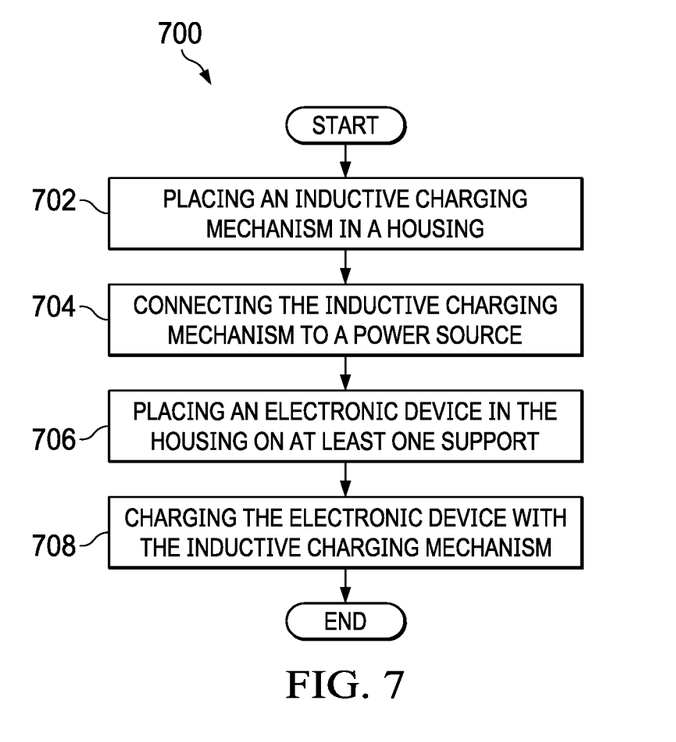
FIG. 7 illustrates a block diagram of a method for charging an electronic device.

FIG. 7 illustrates a block diagram of a method 700 for charging an electronic device. In one implementation, method 700 includes the steps 702-708. Step 702 comprises placing an inductive charging mechanism in a housing. In step 702, the inductive charging mechanism may be a Qi charger or any other inductive charging mechanism. In step 702, the inductive charging mechanism may be placed in any housing, which can include, but is not limited to, the housing 200 depicted in FIGS. 1-2 of the present application. Step 704 comprises connecting the inductive charging mechanism to a power source. In step 704, the inductive charging mechanism may be connected to the power source using a power cord, which can include, but is not limited to, power cord 402 depicted in FIG. 4 of the present application. In step 704, the power source may be an electrical outlet, a battery, a chemical means of power, or any other kind of power source. Step 706 comprises placing an electronic device in the housing on at least one support. In step 706, the electronic device may be any electronic device that is capable of being charged, and the at least one support may be anything in or on the housing that provides support, which can include, but is not limited to, the interior supports 240 disclosed in the present application. Step 708 comprises charging the electronic device with the inductive charging mechanism. Method 700 may be repeated to achieve the desired level of charging by returning to step 702 after completing steps 702-708. Method 700 may include all or only some of steps 702, 704, 706, and 708. In one implementation, method 700 may include more steps than those disclosed in the present application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or steps.

The invention claimed is:

1. A charging device, comprising:
a ventilated housing configured to hold an electronic device, said housing having a generally rectangular front portion with a parabolic cutout section in a front wall of said front portion, and a rear portion coupled to said front portion;
an inductive charging mechanism with a disc portion connected to a board portion and a power cord portion, said inductive charging mechanism configured to charge said electronic device when said electronic device is disposed in said housing; and
a means for coupling said housing to a surface such that a rear external face of said rear portion engages said surface;
wherein said electronic device is held in a hollow section of said front portion and said inductive charging mechanism is separated from the hollow section of said front portion;
wherein a back wall exterior surface of said front portion contains an indentation configured to hold said inductive charging mechanism;
wherein said parabolic cutout section is configured to make a portion of a screen of said electronic device visible to a user when said electronic device is held in said hollow section of said front portion; and
wherein said housing contains at least one support configured to place said electronic device in a proper charging position with respect to said inductive charging mechanism.

2. The charging device of claim 1, further comprising at least one opening through a base wall of said front portion.

3. The charging device of claim 1, wherein said at least one support is coupled to an interior surface of said front portion.

4. The charging device of claim 1, wherein said at least one support is triangular, rectangular, cylindrical, polygonal, or square in shape.

5. The charging device of claim 1, wherein said rear portion is removable from said front portion.

6. The charging device of claim 1, wherein said inductive charging mechanism is operable to charge said electronic device when said housing is coupled to said surface.

7. A charging device, comprising:
a housing, having a generally rectangular front portion with a cutout section in a front wall of said front portion to ventilate the housing and allow a user to view a portion of a screen of an electronic device when placed in the housing;
a rear portion coupled to a back wall of said front portion;
at least one support disposed within and coupled to said front portion of said housing;
an inductive charging mechanism disposed within said rear portion and coupled to said back wall of said front portion of said housing; and
a means for coupling said housing to a surface such that a rear external face of said rear portion engages said surface;
wherein said at least one support is disposed at an angle toward said inductive charging mechanism.

8. The charging device of claim 7, wherein an exterior surface of said back wall of said front portion contains an indentation.

9. The charging device of claim 8, wherein said inductive charging mechanism is disposed in said indentation.

10. The charging device of claim 7, wherein said rear portion of said housing contains at least one opening configured to ventilate said housing.

11. The charging device of claim 7, wherein said at least one support is coupled to an interior surface of said housing.

12. The charging device of claim 7, wherein said at least one support is triangular, rectangular, cylindrical, polygonal, or square in shape.

13. The charging device of claim 7, further comprising:
means for providing power to said inductive charging mechanism.

14. The charging device of claim 7, wherein said means for coupling enables coupling of said housing to said surface with said rear external face of said rear portion oriented in any direction parallel to said surface.

15. The charging device of claim 7, wherein said rear portion is removable from said front portion.

16. A charging device, comprising:
a housing with a front portion, said front portion having:
a back wall exterior surface; and
a parabolic cutout section configured to make a portion of a screen of an electronic device visible to a user when said electronic device is disposed within said housing;
a rear portion operable to cover said back wall exterior surface;
means for holding an inductive charging mechanism in or on said back wall exterior surface;
means for ventilating said housing;
means for supporting said electronic device in a proper charging position within said housing; and
means for coupling said housing to a surface such that a rear external face of said rear portion engages said surface;
wherein said inductive charging mechanism is operable to charge said electronic device disposed within said housing.

17. The charging device of claim 16, wherein said means for coupling enables coupling of said housing to said surface with said rear external face of said rear portion oriented in any direction parallel to said surface.

18. The charging device of claim 16, further comprising:
means for providing power to said inductive charging mechanism.

* * * * *